(No Model.)  3 Sheets—Sheet 1.
J. J. GILBERT.
SIDE SPRING VEHICLE.
No. 489,673.  Patented Jan. 10, 1893.
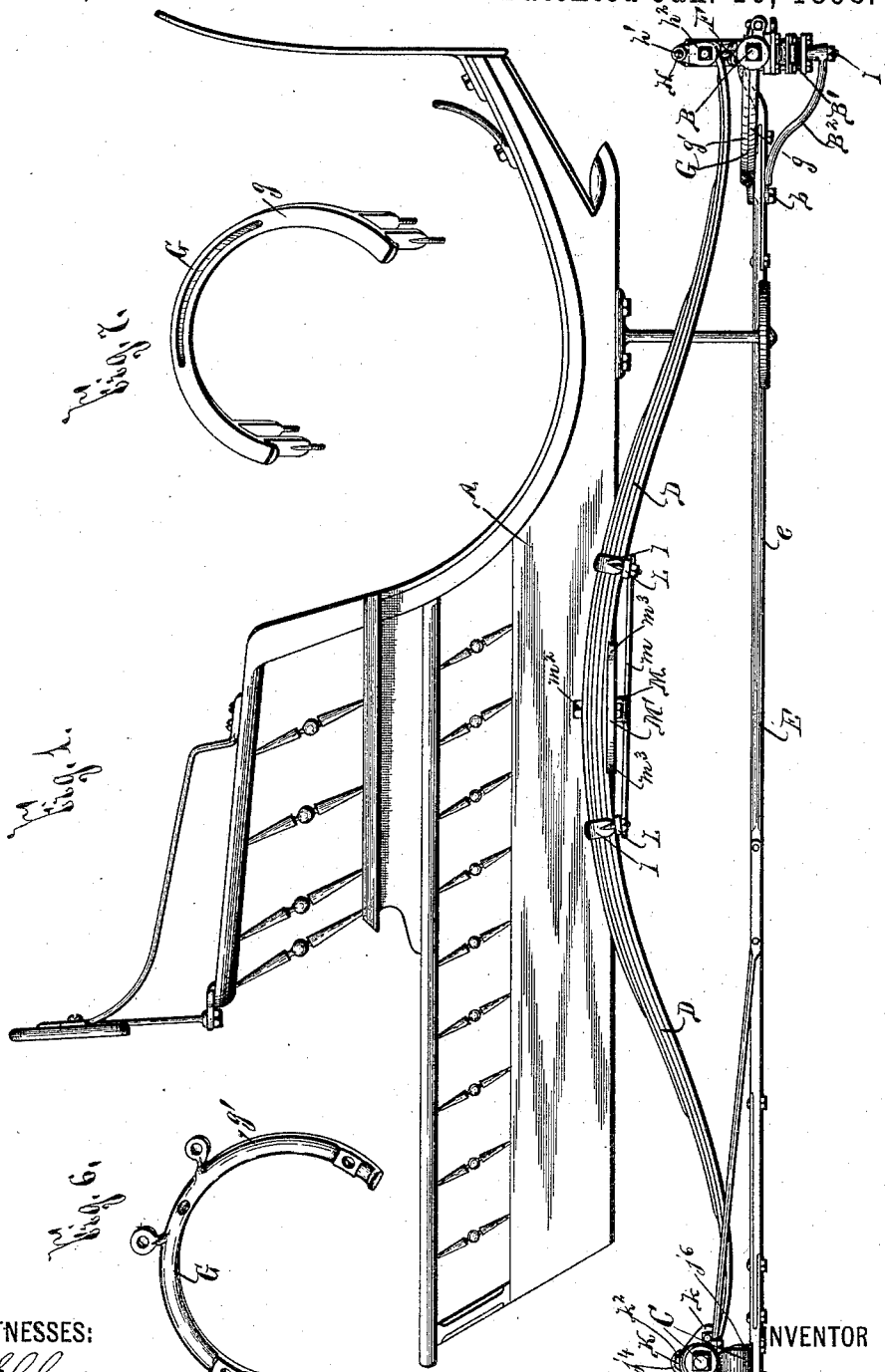
WITNESSES:
H. C. Chase
W. H. Randall
INVENTOR
Joshua J. Gilbert
BY Wilkinson & Parsons
ATTORNEYS.

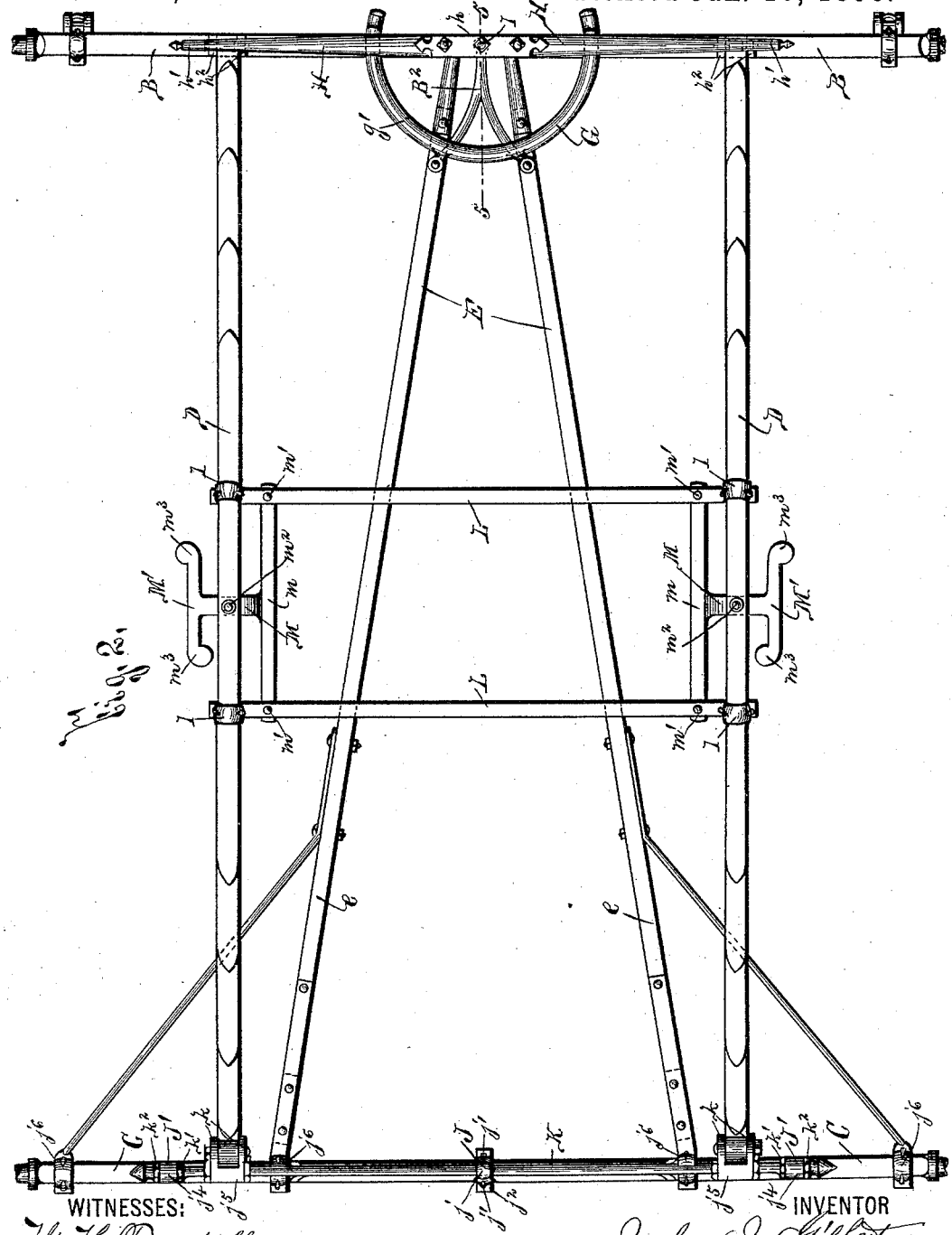

(No Model.) 3 Sheets—Sheet 3.
J. J. GILBERT.
SIDE SPRING VEHICLE.
No. 489,673. Patented Jan. 10, 1893.
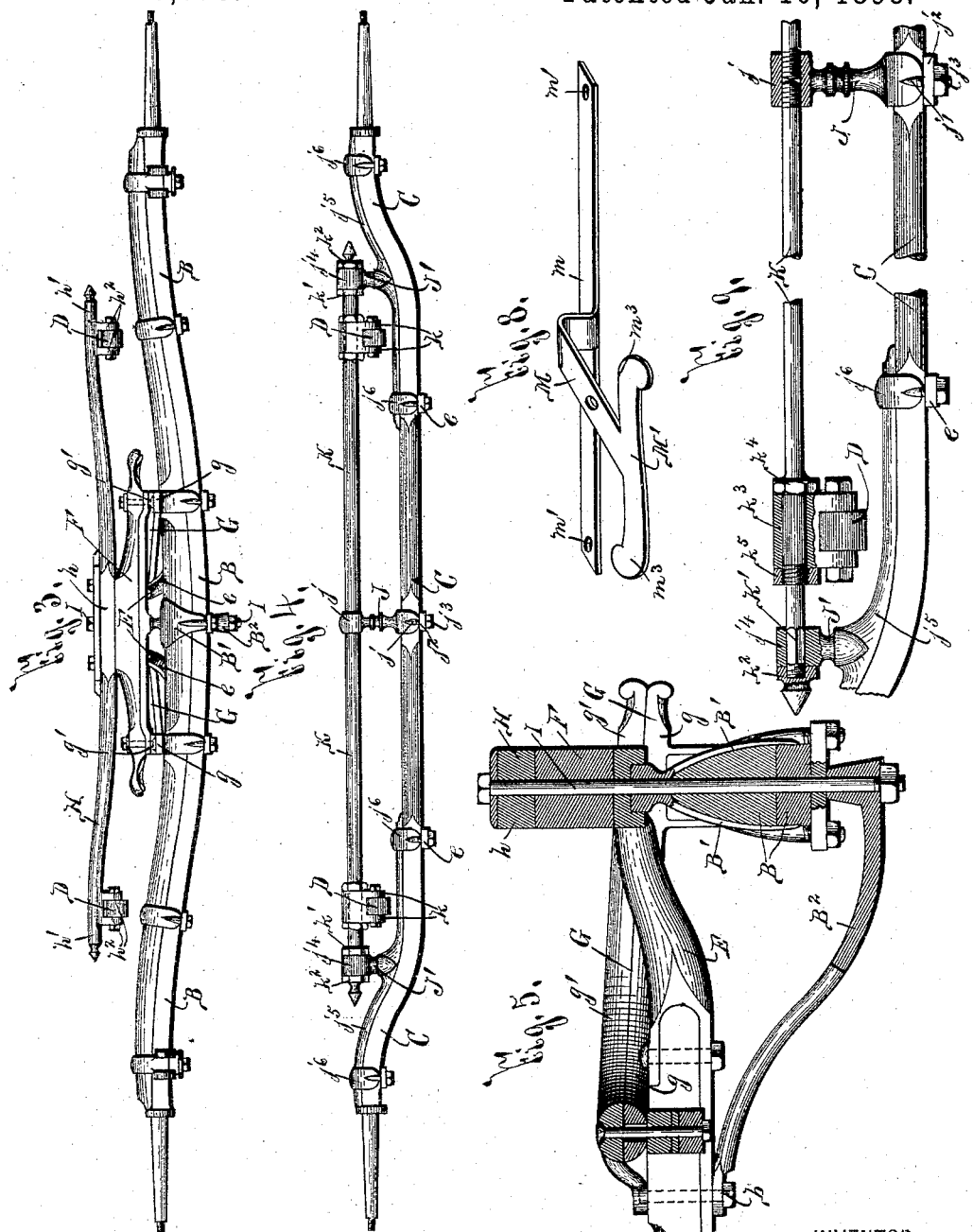
WITNESSES:
INVENTOR
Joshua J. Gilbert
BY
ATTORNEYS.

UNITED STATES PATENT OFFICE.

JOSHUA J. GILBERT, OF SYRACUSE, NEW YORK.

SIDE-SPRING VEHICLE.

SPECIFICATION forming part of Letters Patent No. 489,673, dated January 10, 1893.

Application filed November 27, 1891. Serial No. 413,171. (No model.)

*To all whom it may concern:*

Be it known that I, JOSHUA J. GILBERT, of Syracuse, in the county of Onondaga, in the State of New York, have invented new and useful Improvements in Vehicles, of which the following, taken in connection with the accompanying drawings, is a full, clear, and exact description.

My invention relates to improvements in vehicles, and has for its object the production of a simple device, which is particularly strong, effective and easy in use.

To this end it consists, essentially, in a front spring supporting bar having its central portion supported on the front axle and its extremities slightly elevated, risers or bearings on the rear axle, a rear supporting bar carried by the risers, side springs having their opposite extremities supported by said front and rear supporting bars, tie bars between the side springs at points on opposite sides of their center, and in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is a side elevation of my improved invention, the wheels being removed. Fig. 2 is a top plan view of the running gear, the body and wheels being removed. Figs. 3 and 4 are respectively front and rear elevations of the parts as shown at Fig. 2. Fig. 5 is a detail vertical sectional view, taken on line —5—5—, Fig. 2. Figs. 6 and 7 are isometric perspectives of the upper and lower divisions of the fifth wheel. Fig. 8 is an isometric perspective of the rub iron, and Fig. 9 is an elevation, partly in section, of a portion of the rear spring supporting bar.

—A— represents the vehicle body; —B— C— the front and rear axles, and —D— the side springs, which may be of any desirable form, size and construction.

The reach —E— is composed of sections —e—e— inclining toward each other, their rearward extremities being rigidly secured to the rear axle —C— and their forward extremities to the head block —F—.

—G— represents the fifth wheel between the head block —F— and front axle —B—, which is composed of the lower section —g— rigidly secured to the axle —B— and the top section —g'— rigidly secured to the head block —F—.

—H— is the front spring supporting bar, which consists of a single metallic bar arranged flatwise and having its central portion —h— supported directly upon the head block —F— and indirectly upon the front axle and its extremities —h'—h'— slightly elevated and provided with integral or rigid ears —h²— for the reception of the front ends of the side springs —D—. This construction of spring supporting bar is particularly strong and permits the end of the spring to have a slight yielding motion as the bar is more or less flexible, being usually composed of steel of good quality.

The king bolt —I— passes through the spring supporting bar —H—, head block —F—, the axle —B—, a clip —B'— at the central portion of the axle —B—, and the front extremity of a brace —B²— having its rear extremity secured at —b— to the reach sections —e—e—.

—J—J'— represent risers or bearings upon the rear axle, and —K— the rear spring supporting bar.

—k³—k³— are spring supporting links having one end hinged upon the bar —K— and the other provided with ears —k— for receiving the rear extremities of the side springs —D—. As it is desirable to permit the side springs to expand lengthwise these links —k³— have a rocking movement as immediately described.

The riser —J— consists of the box —j— and clip arms —j'—, which are preferably formed integral for receiving the ends of the clip bar —j²— and the clamping nuts —j³—, and, in order that this riser may be more rigidly secured upon the axle, the central portion of the axle is preferably formed angular in cross section.

The risers —J'— are arranged at opposite extremities of the bar —K— at points outside of the ears —k—, and consist, essentially, of the boxes —$j^4$— and laterally extending feet —$j^5$— formed integral therewith and adapted to be secured by clips —$j^6$— to the axle —C—. It will be noted that the central portion of the rear axle is deflected downwardly, and that the feet —$j^5$— of the risers —J'— are so arranged as to closely fit the curve of the deflected axle, and the boxes —$j^4$— are of such elevation that the rocking bar —K— is but slightly raised above the plane of the extremities of the axle —C—. Bearing against the inner face of the boxes —$j^4$—are shoulders —$k'$— upon the bar —K—, and against the outer face of said boxes are movable shoulders —$k^2$—.

Upon reference to the foregoing it will be readily apparent that the hinged links on the spring supporting bar —k— permit the side springs to lengthen slightly under tension, and thus give an easy roll and pleasing movement to the spring, obviating all quick and continuous jar to the occupant as is the case when the ends of the side springs are rigidly secured.

—L— represent tie bars having their adjacent extremities rigidly secured by clips —l— to the side springs —D— at points on opposite sides of the center of the side springs, whereby said springs are securely tied together without restricting their movement as would be the case were a head block secured upon said side springs and the tie bars rigidly secured to the extremities of the head block as in my previous patent No. 456,112, issued July 14, 1891. The body —A— is suitably secured to these tie bars by nuts or other clamps, and it will be evident that, as the bars are somewhat separated from each other, they form a wide support for the body.

—M— represents the rub irons, best seen at Figs. 2 and 8, which consist of a bar —m— secured at —$m'$— to the tie bars —L—, and the arm —M'— extending outwardly from the bar —M— to a point outside of the side spring. This arm —M'— is preferably integral with the bar —m—, is slightly elevated above the same, is rigidly secured to the side spring by a bolt or clamp —$m^2$—, and is provided with lateral extensions —$m^3$— forming a rubbing or wearing surface. It will thus be noted that the peculiar construction of the rub iron is very strong and effective, and tends to prevent the tie bars —L— from spreading and to further secure said tie bars to the springs.

At Fig. 9 I have shown a modified form of my invention, in which the rear spring supporting bar —K— instead of being formed of a continuous piece is composed of two sections having their adjacent ends mounted in the central riser —J—.

The operation of my invention will be readily perceived from the foregoing description and upon reference to the drawings, and it will be particularly noted that the front spring supporting bar is extremely strong, and is capable of a slight yielding movement when the side springs are under tension; that the rear spring supporting bar permits the side springs to slightly elongate under tension, and that the body is supported on the side springs in such a manner that the central portion thereof is not prevented from flexibility.

It will be noted that I do not herein claim the combination with an axle with depressed central portion, posts provided with journal bearings clipped to said axle, a rocking bar mounted in said journal, and side springs hung to ears depending from said rock bar, as I prefer to use a stationary instead of a rocking bar.

Having thus fully described my invention, what I claim as new and desire to secure by Letters Patent is—

1. In a vehicle, the combination with the front and rear axles and the wheels thereon; of a body, a head-block above the front axle, a fifth wheel between the front axle and the head-block, a front spring supporting bar arranged flatwise and having its central portion rigidly secured to the head-block and its extremities slightly tapered, and inclined upwardly, and provided with integral ears, and side springs having their rear ends supported on the rear axle and their front ends hinged to the ears of the spring supporting bar, substantially as and for the purpose described.

2. In a vehicle, the combination with the body and the running gear having a front axle and having a rear axle risers or bearings mounted on the rear axle and extended upwardly above the same, a spring supporting bar rigidly secured to said risers, and side springs having their front ends supported by the front axle and their rear ends connected to and supported upon said bar, substantially as and for the purpose described.

3. In a vehicle, the combination with the body and the running gear having a rear axle; of risers or bearings mounted on the rear axle and extending upwardly above the same, a spring supporting bar disposed in a plane above the top face of the rear axle and having its opposite ends supported by said risers, links having one extremity hinged to said bar, and side springs having their ends hinged to the opposite ends of said links, and adapted to enter between the rear axle and said supporting bar, substantially as and for the purpose set forth.

4. In a vehicle, the combination with the body and the running gear having a rear axle formed with a downwardly deflected central portion, side springs having their ends normally disposed above the deflected central portion of the axle, risers or bearings mounted on the rear axle and extending upwardly above the ends of the side springs, a rear spring supporting bar having its opposite ends supported in said risers, and links having one end journaled on said bar and the other connected to the ends of the side springs, substantially as and for the purpose specified.

5. In a vehicle, the combination with the body and the running gear having a rear axle provided with a central depressed portion, risers or bearings mounted on the rear axle and extending upwardly above the same, a spring supporting bar having its opposite extremities mounted in said risers, an adjustable shoulder on the rod bearing against one of said risers, and side springs connected to and supported upon said rod, substantially as and for the purpose described.

6. In a vehicle, the combination with the running gear and body; of a front spring supporting bar having its central portion supported upon the front axle and its extremities inclined slightly upward, projecting bearings on the rear axle extending upwardly above the top face thereof, a rear spring supporting bar supported in said bearings, and side springs having their opposite extremities disposed normally in planes above the front and rear axles and supported on said front and rear supporting bars, substantially as and for the purpose specified.

7. In a vehicle, the combination with the front axle and the wheels thereon; of a body, a head-block above the front axle, a fifth wheel between the front axle and head-block, a front spring supporting bar having its central portion rigidly secured to the head-block and its extremities slightly tapered and provided with attaching ears, a rear axle having its central portion deflected downwardly and the wheels thereon, side springs connected to the vehicle body with their forward ends hinged to the attaching ears at the ends of the front bar and their rear ends disposed normally in a plane above the deflected portion of the rear axle, risers or bearings on the rear axle extending upwardly above the ends of the side springs, a rear spring supporting bar having its extremities supported in said risers and links having one end journaled on said bar and the other connected to the rear ends of the side springs, substantially as and for the purpose specified.

8. In a vehicle, the combination with the body and the running gear having a rear axle; of risers or bearings mounted on the rear axle and extending upwardly above the same, a spring supporting bar disposed in a plane above the top face of the rear axle and having its opposite ends journaled in said risers and provided with projecting ears, side springs having their ends hinged to the ears and adapted to enter between the rear axle and said spring supporting bar, and tie bars rigidly secured to said side springs at points on the opposite sides of the center thereof, whereby the central portion of the side spring is free to move, substantially as and for the purpose set forth.

9. In a vehicle, the combination with the running gear and body; of upwardly extending risers or bearings on the rear axle, a rear spring supporting bar supported by said risers, side springs having their front extremities supported on the front axle, and their rear extremities on said bar tie bars for supporting the body rigidly secured to said side springs at points on opposite sides of the center thereof whereby the central portion of the side springs is free to yield, and a bar —m— having its end rigidly secured to said tie bars, for preventing spreading thereof, substantially as and for the purpose described.

10. In a vehicle, the combination with the running gear and body; of a front spring supporting bar having its central portion supported upon the front axle, projecting bearings on the rear axle, a rear spring supporting bar supported by said bearings, side springs having their opposite extremities supported on said front and rear supporting bars, tie bars —L— rigidly secured at their opposite extremities to the separate side springs at opposite sides of the center of said side springs whereby the central portion of the side springs is free to yield, a bar —m— having its ends rigidly secured to said tie bars, an arm projecting outwardly from the central portion of said bar —m— to the springs, and a clamp for securing said projecting arm to the side spring, substantially as and for the purpose specified.

11. In a vehicle, the combination with the rear axle, a spring supporting bar mounted above the axle, and a side spring supported on said bar; of the herein described riser formed with an integral box and lateral clip arms extending lengthwise of the axle and rigidly secured thereto, substantially as and for the purpose set forth.

12. In a vehicle, the combination with an axle having its central portion deflected downwardly, risers at the opposite extremities of said central portion, each being formed with a box extending lengthwise of the axle and with projecting feet extending laterally beyond the box and conforming to the curvature of the adjacent portion of the axle and rigidly secured to the axle, an additional riser interposed between the former risers, a rear spring supporting bar mounted in said box, and a spring supported on said bar, substantially as specified.

13. In a vehicle, the combination with front and rear axles having their central portions deflected downwardly, a reach having its opposite extremities rigidly secured to the axles, a head-block, a fifth wheel between the head-block and the front axle, a front spring supporting bar having its central portion rigidly secured to the head-block and its extremities slightly tapered, side springs having their forward ends hinged to the opposite extremities of the spring supporting bar and their rearward ends disposed normally in a plane above the deflected portion of the rear axle, risers or bearings upon the rear axle extending upwardly above the rear ends of the side springs, and a rear spring supporting bar having its extremities supported in the risers or bearings, and links having one end hinged to the rear spring supporting bars and the other hinged to the rear ends of the side springs, substantially as described.

In testimony whereof I have hereunto signed my name, in the presence of two attesting witnesses, at Syracuse, in the county of Onondaga, in the State of New York, this 13th day of November, 1891.

JOSHUA J. GILBERT.

Witnesses:
CLARK H. NORTON,
L. M. BAXTER.